US011285621B2

(12) United States Patent
Luo et al.

(10) Patent No.: US 11,285,621 B2
(45) Date of Patent: Mar. 29, 2022

(54) COMPLIANT ROBOT END-EFFECTOR AND METHOD OF CONTROLLING THE SAME

(71) Applicants: Beijing Jingdong Shangke Information Technology Co., Ltd., Beijing (CN); JD.com American Technologies Corporation, Mountain View, CA (US)

(72) Inventors: Yudong Luo, Mountain View, CA (US); Wei Xi, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 247 days.

(21) Appl. No.: 16/590,260

(22) Filed: Oct. 1, 2019

(65) Prior Publication Data

US 2021/0094190 A1    Apr. 1, 2021

(51) Int. Cl.
*B25J 15/06* (2006.01)
*B25J 13/08* (2006.01)
*B25J 9/16* (2006.01)

(52) U.S. Cl.
CPC ......... *B25J 15/0625* (2013.01); *B25J 9/1694* (2013.01); *B25J 13/086* (2013.01); *B25J 15/0675* (2013.01)

(58) Field of Classification Search
CPC .......................... B25J 15/0625; B25J 15/0675; B25J 15/0616; B25J 15/0683; B25J 13/086; B25J 9/1694; B25J 9/02
See application file for complete search history.

(56) References Cited

U.S. PATENT DOCUMENTS

| 5,794,339 A | 8/1998 | Pearson et al. |
| 7,222,901 B2 | 5/2007 | Gebauer et al. |

(Continued)

FOREIGN PATENT DOCUMENTS

| CN | 1556740 A | 12/2004 |
| CN | 101238775 A | 8/2008 |

(Continued)

OTHER PUBLICATIONS

The State Intellectual Property Office of People's Republic of China, Office Action No. 2021062903006730, Application No. CN202011037954.1, dated Jul. 2, 2021.

*Primary Examiner* — Stephen A Vu
(74) *Attorney, Agent, or Firm* — China Science Patent & Trademark US LLC; Shanyun Lu

(57) ABSTRACT

An end effector for a robotic arm. The end effector includes an angle compensator for attaching a suction cup, a vacuum control valve, a vacuum generator, a level compensator, and an extension tube which are sequentially connected along a central axis and in fluid communication, and a vacuum sensor connected to the vacuum control valve for measuring vacuum, a proximity sensor attached to the extension tube 121 for determining position of the level compensator. The vacuum is generated when compressed air passes the extension tube, the level compensator and the vacuum generator along the central axis. The level compensator provides compensation along the central axis.

19 Claims, 6 Drawing Sheets

(56) References Cited

U.S. PATENT DOCUMENTS

| | | | |
|---|---|---|---|
| 2005/0258657 A1 | 11/2005 | Gebauer et al. | |
| 2013/0090763 A1* | 4/2013 | Simaan | A61B 5/11 700/258 |
| 2014/0305217 A1* | 10/2014 | Tapia | G01N 27/9013 73/618 |
| 2015/0135459 A1* | 5/2015 | Lee | F03D 80/55 15/246 |
| 2015/0314890 A1* | 11/2015 | DesJardien | B25J 5/007 212/324 |
| 2016/0039550 A1* | 2/2016 | Boudreau | B65B 35/36 53/446 |
| 2019/0248600 A1* | 8/2019 | Nesbit | B25J 15/0625 |

FOREIGN PATENT DOCUMENTS

| | | |
|---|---|---|
| CN | 206665684 U | 11/2017 |
| CN | 108098757 A | 6/2018 |
| CN | 108608452 A | 10/2018 |

* cited by examiner

COMPLIANT ROBOT END-EFFECTOR AND METHOD OF CONTROLLING THE SAME

FIELD

The present disclosure relates generally to robotics technology, and more particularly to a compliant robot end-effector suitable for manipulating objects in a limited space.

BACKGROUND

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

In logistics automation application, robot arm has been widely adopted for material handling and manipulation. Among many applications, bin picking presents challenges to robot arm gripper design due to limited space in the bin and various shapes and configurations of objects in the bin for being picked up. Traditional gripper applies suction cup at the end of a long extension rod. There are three major drawbacks with current design: (1) The gripper has limited capability to comply with normal direction of the object surface being picked. It could easily cause collision and damage the objects being picked up if sensor perception result is not accurate. (2) The commercially available force/torque sensor is typically expensive which prevents its massive adoption. (3) The vacuum generation and release takes time due to long air pipe which degrades cycle time per picking operation.

Therefore, an unaddressed need exists in the art to address the aforementioned deficiencies and inadequacies.

SUMMARY

In certain aspects, the present disclosure provides a compact, economical design of an end effector for being used with a robotic arm. The end effector incudes an angle compensator and a level compensator to offer three degree of freedom (DOF) surface normal compliance; and includes a proximity sensor and a range sensor to provide low-cost position sensing, which could be used as feedback signals to control robot response when it is contacting an object to be picked up.

In certain aspects, the present disclosure relates to an end effector for a robotic system. In certain embodiments, the end effector includes: an angle compensator for a suction cup to be attached thereon; a vacuum control valve connected to and in fluid communication with the angle compensator; a vacuum generator connected to and in fluid communication with the vacuum control valve; a level compensator connected to and in fluid communication with the vacuum generator; an extension tube connected to and in fluid communication with the level compensator; a vacuum sensor connected to the vacuum control valve and configured to measure vacuum in the vacuum control valve; and a proximity sensor attached to the extension tube and configured to determine position of the level compensator.

The angle compensator, the vacuum control valve, the vacuum generator, the level compensator, and the extension tube are substantially aligned along a central axis. The vacuum is generated when compressed air passes the extension tube, the level compensator and the vacuum generator along the central axis. The level compensator provides compensation along the central axis.

In certain embodiments, the end effector further includes a range sensor attached to the extension tube and configured to determine the position of the level compensator. In certain embodiments, the range sensor is an optic sensor. In certain embodiments, when the suction cup is placed on an object and the vacuum is higher than a threshold vacuum, the end effector starts manipulation of the object, and when a distance between the proximity sensor and the level compensator is less than a threshold distance or when a force detected by the range sensor is greater than a threshold force, the end effector stops the manipulation of the object.

In certain embodiments, the angle compensator is a passive ball joint angle compensator. In certain embodiments, the end effector further includes an electronic regulator controlling open and close of the vacuum control valve. In certain embodiments, the vacuum generator is a vacuum ejector. In certain embodiments, the proximity sensor is at least one of an inductive sensor and an electromagnetic sensor.

In certain embodiments, the extension tube has a through hole for accommodating the proximity sensor, such that a part of the proximity sensor enters into the extension tube for determining the position of the level compensator accurately.

In certain embodiments, the extension tube has a closed structure, and the proximity sensor is attached to outer surface of the extension tube.

In certain embodiments, the end effector further includes a calibration board attached to outer surface of the extension tube for calibrating position of the end effector.

In certain aspects, the present disclosure relates to a robotic system. In certain embodiments, the robotic system includes an end effector, a robotic device, and a controller. The end effector includes a suction cup, an angle compensator having the suction cup attached thereon, a vacuum control valve connected to and in fluid communication with the angle compensator, a vacuum generator connected to and in fluid communication with the vacuum control valve, a level compensator connected to and in fluid communication with the vacuum generator, an extension tube connected to and in fluid communication with the level compensator, a vacuum sensor connected to the vacuum control valve for measuring vacuum in the vacuum control valve, a proximity sensor attached to the extension tube and configured to determine a distance between the proximity sensor and the level compensator, and a range sensor attached to the extension tube and configured to determine a deformation force of the level compensator. The angle compensator, the vacuum control valve, the vacuum generator, the level compensator, and the extension tube are substantially aligned along a central axis, vacuum is generated when compressed air passes the extension tube, the level compensator and the vacuum generator along the central axis, and the level compensator provides compensation along the central axis.

The robotic device is connected to the end effector and configured to control operation of the end effector. The controller is connected to the robotic device, the vacuum sensor, and the proximity sensor.

The controller is configured to, upon receiving the vacuum from the vacuum sensor, the distance from the proximity sensor, and the force from the range sensor, control the robotic device to start manipulation of an object when the vacuum is higher than a threshold vacuum, and stop the manipulation of the object when the distance is less than a threshold distance or the force is greater than a threshold force.

In certain embodiments, the robotic system further includes a visual sensor connected to the controller and configured to capture image of the end effector.

In certain embodiments, the angle compensator is a passive ball joint angle compensator, the vacuum generator is a vacuum ejector, the proximity sensor is at least one of an inductive sensor and an electromagnetic sensor, and the range sensor is an optic sensor.

In certain embodiments, the extension tube includes a through hole for accommodating the proximity sensor, such that a part of the proximity sensor enters into the extension tube for determination the position of the level compensator accurately.

In certain embodiments, the extension tube has a closed structure, the proximity sensor is attached to outer surface of the extension tube, and the range sensor is placed inside the extension tube in an end away from the level compensator.

In certain aspects, the present disclosure relates to a method for controlling a robotic system. In certain embodiments, the robotic system includes an effector, a robotic device, and a controller.

The end effector includes a suction cup, an angle compensator having the suction cup attached thereon, a vacuum control valve connected to and in fluid communication with the angle compensator, a vacuum generator connected to and in fluid communication with the vacuum control valve, a level compensator connected to and in fluid communication with the vacuum generator, an extension tube connected to and in fluid communication with the level compensator, a vacuum sensor connected to the vacuum control valve and configured to measure vacuum in the vacuum control valve, a proximity sensor attached to the extension tube and configured to determine a distance between the proximity sensor and the level compensator, and a range sensor attached to the extension tube and configured to determine a deformation force of the level compensator. The angle compensator, the vacuum control valve, the vacuum generator, the level compensator, and the extension tube are substantially aligned along a central axis, the vacuum is generated when compressed air passes the extension tube, the level compensator and the vacuum generator along the central axis, and the level compensator provides compensation along the central axis.

The robotic device is connected to the end effector and configured to control operation of the end effector. The controller connected to the robotic device, the vacuum sensor, and the proximity sensor.

The method includes: receiving, by the controller, the vacuum from the vacuum sensor, the distance from the proximity sensor, and the force from the range sensor; controlling the robotic device to start manipulation of an object when the vacuum is higher than a threshold vacuum; and stopping the manipulation of the object when the distance is less than a threshold distance or the force is greater than a threshold force.

In certain embodiments, the angle compensator is a passive ball joint angle compensator, the vacuum generator is a vacuum ejector, the proximity sensor is at least one of an inductive sensor and an electromagnetic sensor, and the range sensor is an optic sensor.

In certain embodiments, the extension tube includes a through hole for accommodating the proximity sensor, such that a part of the proximity sensor enters into the extension tube for determination the position of the level compensator accurately.

In certain embodiments, the extension tube has a closed structure, the proximity sensor is attached to outer surface of the extension tube, and the range sensor is placed inside the extension tube in an end away from the level compensator.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION

Figure 1:
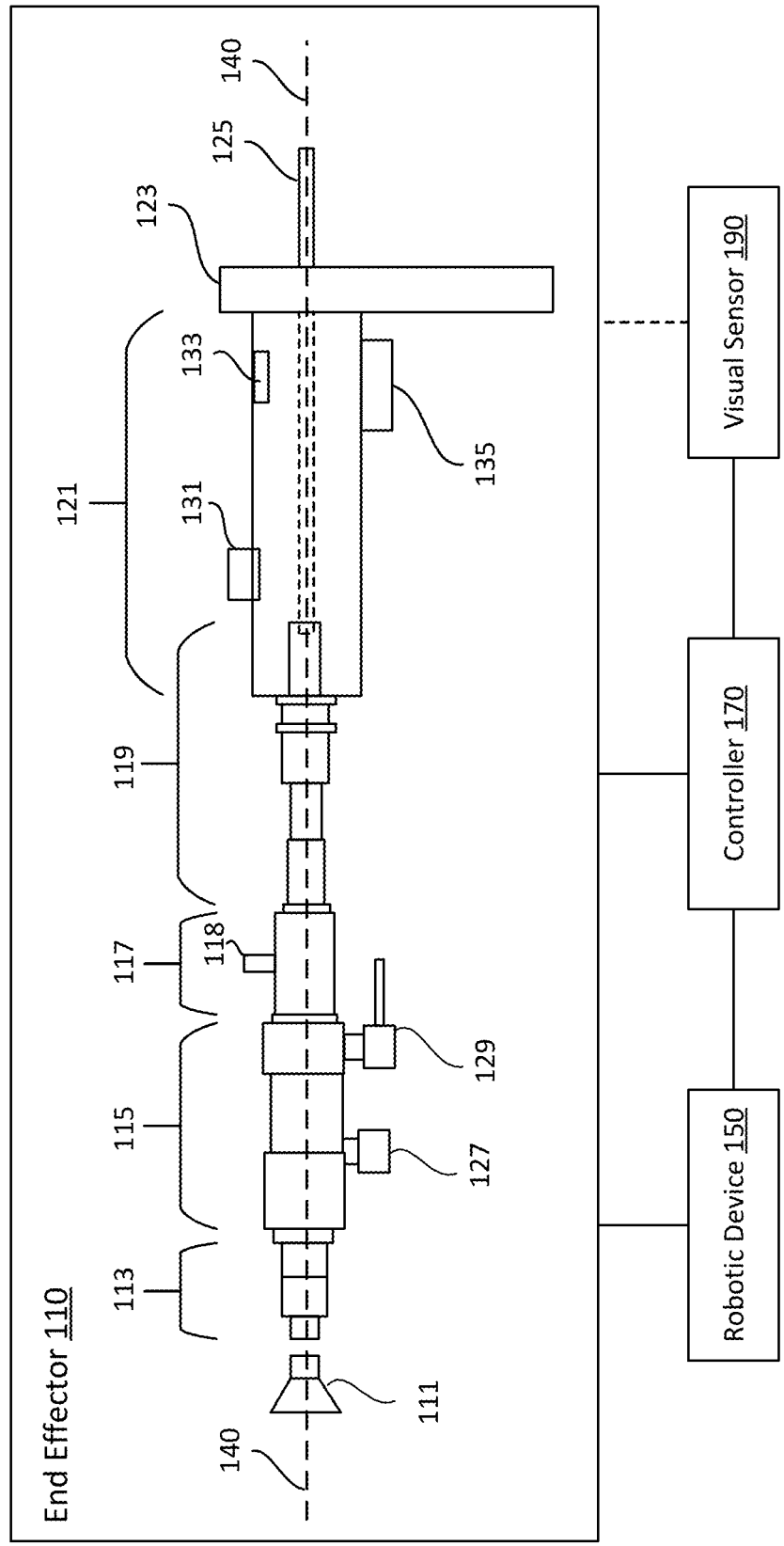
FIG. 1 schematically depicts a robotic system according to certain embodiments of the present disclosure.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Further, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the figures.

As used herein, "plurality" means two or more. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

FIG. 1 schematically depicts a robotic system 100 according to certain embodiments of the present disclosure, where the end effector 110 of the robotic system 100 is compliant with operations in a small space and has low cost. As shown in FIG. 1, the robotic system 100 includes the end effector 110, a robotic device 150, a controller 170, and a visual sensor 190.

The end effector 110 includes, from the front end for contacting object to be manipulated to the back end connecting to a robotic arm of the robotic device 150, a suction cup 111, an angle compensator 113, a vacuum control valve 115, a vacuum generator 117, a level compensator 119, an extension tube 121, a flange 123, and a compressed air hose 125. Those components are substantially aligned along a central axis 140, and are in fluid communication sequentially. A vacuum sensor 127 is attached to the vacuum control valve 115 for measuring vacuum. An electric regulator (not shown) is connected to the vacuum control valve 115 and is configured to adjust steplessly (or control the open and close of) the vacuum control valve 115 upon receiving electronic signals via a cable 129. A proximity sensor 131 and a range sensor 133 are attached to different parts of the extension tube 121 and are configured to measure position of the level compensator 119. A calibration board 135 is attached to the extension tube 121 for calibrating the end compensator 110.

The suction cup 111 is also known as a vacuum suction cup or a vacuum gripper suction cup. The suction cup 111 has a front end for contacting surface of an object, and a back end for communicating with a vacuum channel. A through hole usually exists between the front end and the back end, and the front end of the suction cup 111 is preferably larger than the back end of the suction cup 111. The suction cup 111 is configured to work with a robotic arm, specifically a front end of a gripper or the end effector 110. When the suction cup 111 is placed in a normal direction onto a surface of the object and the vacuum is provided, the front end of the suction cup 111 grasps the object firmly with a suction force generated by the vacuum, and moves the object according to instructions. The movement of the object by the suction cup 111 may include moving the object upward, moving the object horizontally from one location to another location, putting down the object, flipping the object, etc. In certain embodiments, the movement is programed in the controller 170 and operated by the robotic arm of the robotic device 150. In certain embodiments, the front end of the suction cup is made of a flexible material that is able to deform to a certain extent, while strong enough to hold the object steady.

The angle compensator 113 has a front end and a back end. The front end of the angle compensator 113 is connected to the back end of the suction cup 111, and the connection is airtight. In certain embodiments, the angle compensator 113 has a compact structure. The angle compensator 113 is configured to compensate for the difference in angle between the suction cup 111 and the object that the suction cup 111 is in contact with. In certain embodiments, the angle compensator 113 is a passive compensator based on ball joint. In certain embodiments, the angle compensator 113 can also be a similar passive compensator based on universal joints or based on flexible material deformation, or an active compensator which achieves angle compensation by controlling a motor and air pressure.

The vacuum control valve 115 has a front end and a back end. The front end of the vacuum control valve 115 is connected to the back end of the angle compensator 113, and the connection is airtight. In certain embodiments, the vacuum control valve 115 has a compact structure. In certain embodiments, the vacuum sensor 127 is integrally formed with the vacuum control valve 115, a part of the vacuum sensor 127 is inserted into the inner channel of the vacuum control valve 115 to measure the vacuum in the vacuum control valve 115 in real time, and another part of the vacuum sensor 127 is in communication with the controller 170 to report the measured vacuum. In certain embodiments, the electronic regulator (not shown) is integrally formed with the vacuum control valve 115 or is installed onto the vacuum control valve 115, to control air/vacuum pressure steplessly in proportion to an electric signal, or simply control on and off of the vacuum control valve 115. The electric cable 129 is connected to the electronic regulator, and is configured to receive electric signals instructed by the controller 170, so as to adjust the electronic regulator. When vacuum is needed, the electronic regulator 120 controls the gate to an open state, such that vacuum is established from the vacuum control valve 115 through the section cup 111. When the vacuum is not needed anymore, the electronic regulator 120 controls the gate to a close state, such that vacuum is released from the vacuum control valve 115 through the section cup 111. In certain embodiments, the electronic regulator is electrically connected with the controller 170 via the electric cable 129, so that the controller 170 can control the electronic regulator according to an instruction. In certain embodiments, instead of controlling the gate open and close, the electronic regulator may also control the gate to partially open, so as to provide more accurate adjustment on the vacuum in the vacuum control valve 115.

The vacuum generator 117 has a front end and a back end. The front end of the vacuum generator 117 is connected to the back end of the vacuum control valve 115, and the connection is airtight. In certain embodiments, the vacuum generator 117 has a compact structure. In certain embodiments, the vacuum generator 117 is an ejector type vacuum generator based on pneumatic principle. Specifically, when compressed air is supplied from the level compensator 119 to the vacuum generator 117, and the compressed air passes through the nozzle or exhaust 118, air is drawn from the front end of the vacuum generator 117, so as to form vacuum in the vacuum control valve. In certain embodiments, the vacuum generator 117 may also be a small air blower or an electronic vacuum pump that generate a vacuum based on electromechanics.

The level compensator 119 has a front end and a back end. The front end of the level compensator 119 is connected to the back end of the vacuum generator 117, and the connection is airtight. In certain embodiments, the level compensator 119 has a compact structure. The level compensator 119 is configured to compensate the difference in height between the suction cup 111 and the object. In certain embodiments, the level compensator 119 is based on a passive compensation mechanism and has a build-in spring. When the end effector 110 is pushed too much toward the object, the build-in spring of the level compensator 119 is compressed and the level compensator 119 is shorter. When the end effector 110 is pushed not close enough toward the object, the extension of the build-in spring and subsequent extension of the whole level compensator 119 make sure the suction cup 111 is in contact with the object. In certain embodiments, the level compensator 119 may also use passive compensation based on elastic deformation, or active compensation based on force feedback linear actuator, hydraulic/air pressor actuator, or smart material such as shape memory alloy.

The extension tube 121 has a front end and a back end. The front end of the extension tube 121 is connected to the back end of the level compensator 119, and the connection is airtight. The extension tube 121 is used to accommodate the deformation of the level compensator 119 while maintaining a compact structure. In certain embodiments, the extension tube 121 is further configured to facilitate installation of the proximity sensor 131, the range sensor 133 and optionally the calibration board 135.

In certain embodiments, the extension tube 121 is a non-closed extension tube or rod that facilitates the use of an intrusive/invasive proximity sensor 131 for optimal measurement result.

In certain embodiments, the extension tube 121 is a closed extension tube or rod which form a pressure-resistant sealing buffer to prevent the compressed air hose 125 for conveying compressed air from being directly connected to the end of the level compensator, so as to prevent the hose 125 from affecting the level compensator 119.

Kindly note the level compensator 119 is flexible in length along the central axis 140 based on the force and angle between the suction cup 111 and the object. In certain embodiments, the front end of the level compensator 119 is fixed to the vacuum generator 117, while the back end of the compensator 119 is moveable inside the extension tube 121.

The flange 123 has a front end and a back end. The front end of the flange 123 is connected to the back end of the extension tube 121, and the back end of the flange 123 matches the robotic arm, so that the end effector 110 can be installed easily on the robotic arm of the robotic device 150. The compressed air hose 125 passes through the flange 123 into the extension tube 121. In certain embodiments, the flange 123 is a co-axis version, and the end effector 110 and the robotic arm are aligned in one axis. In other embodiments, the flange 123 can also be off-axis, the end effector 110 and the robotic arm of the robotic device 150 are connected on opposite side of the flange 123 without being aligned in the same axis.

The compressed air hose 125 is configured to provide compressed air to the extension tube 121. Because the extension tube 121, the level compensator 119 and the vacuum generator 117 are in fluid communication, the compressed air goes all the way to the vacuum generator 117. Specifically, the compressed air enters the end effector 110 through the compressed air hose 125 and leaves the end effector 110 out of the nozzle 118. In certain embodiments, when the extension tube 121 is a non-closed extension tube, the compressed air hose 125 may extend into the inside of the level compensator 119, so that the compressed air is isolated from the inside space of the extension tube 121. When the extension tube 121 is a closed extension tube, the compressed air hose 125 may just pass the flange 123 into the inside of the extension tube 121. In this way, the inside of the extension tube 121 is filled with the compressed air, the compressed air in the extension tube 121 is in fluid communication with the level compensator 119, and there is no need for the direction connection from the compressed air hose 125 and the level compensator 119.

The central axis 140 is an imaginary axis used to indicate that the angle compensator 113, the vacuum control valve 115, the vacuum generator 117, the level compensator 119, and the extension tube 121 are substantially aligned from the front to the back, so as to achieve a compact design.

The vacuum sensor 127 is installed or integrally formed with the vacuum control valve 115. The vacuum sensor 127 is configured to determine gripping performance between the suction cup 111 and the object to ensure the success rate and efficiency of the grasping. Because the vacuum control valve 115 is close to the suction cup 111, and the vacuum sensor 127 is place right at the vacuum control valve 115, the vacuum sensor 127 is able to sense the vacuum (and adjust the vacuum via the electronic regulator 120) in the shortest time to reduce the required time for picking and releasing the object. In certain embodiments, the measured vacuum is represented by a negative air pressure relative to the atmosphere and is named $P_a$, the vacuum of a smaller reading (such as −10 Hg) indicates a stronger vacuum than the vacuum of a larger reading (such as −5 Hg). Alternatively, the measure vacuum may also be represented as a positive pressure.

The electronic regulator is configured to control or adjust the vacuum control valve 115 according to instructions received from the controller 170. As described above, because the vacuum control valve 115 is close the suction cup 111 and the object, the sensing and the adjustment of the vacuum in the vacuum control valve 115 ensures a short response time for the operations of the object by the suction cup 111.

The proximity sensor 131 is attached to the extension rube 121 and configured to measure the position of the level compensator 119, and report the measurement to the controller 170. The proximity sensor 131 functions as the position/force switch to avoid damage to the objects when the suction cup 111 picks up the object. Specifically, when the suction cup 111 pushes or sucks the object with a strong force, the level compensator 119 may be compressed too much. Too short length of the level compensator 119 due to excessive compression can be measured by the proximity sensor 131. In response to the measurement, the controller 170 may instructs the robotic arm to stop operation of the end effector 110, and monitor the vacuum in the vacuum control valve 115 to determine the next action, or release the suction cup 111. In certain embodiments, the measured proximity is represented by a distance between the proximity sensor 131 and the back end of the level compensator 119 and is named $S_p$, and a smaller $S_p$ indicates a larger deformation of the spring of the level compensator 119, that is, the back end of the level compensator 119 enters more into the extension tube 121. In certain embodiments, the level compensator 119 compensates by compression and only compression of the level compensator 119 is measured. In certain embodiments, the level compensator 119 is configured to be compressed or extended, and both the compression and the extension are measured.

As described above, when the extension tube 121 is a non-closed extension tube, the proximity sensor 131 may be installed from a though hole on the surface of the extension tube 121, for example by screw it in the hole. The part of the proximity sensor 131 inside the extension tube 121 is used for measuring, which is accurate since that part is close to the level compensator 119. The part of the proximity sensor 131 outside the extension tube 121 is for example a cable connected to the controller 170 to report the measurement. When the extension tube 121 is a closed extension tube, the proximity sensor 131 may be attached on the outer surface of the extension tube 121, which will not affect the sealed structurer of the extension tube 121. In certain embodiments, the proximity sensor 131 is installed on the extension tube 121 using a 3D printing mounting adapter.

In certain embodiments, the proximity sensor 131 is an inductive or electromagnetic sensor, where magnetic components such as magnetic ring may be attached to the front end of the level compensator 119. In other embodiments, the proximity sensor 131 may also be photoelectric, ultrasonic, or capacitive sensors.

The range sensor 133 is attached to the extension tube 121 and configured to estimate the deformation of the level compensator 119 by measuring the distance to the back end of the level compensator 119. In certain embodiments, the range sensor 133 may detect the distance using sound wave such as ultrasonic wave, or using light such as laser. In certain embodiments, the range sensor 133 converts the distance to force information, so that the detected force can be used for robotic arm force feedback control. In certain embodiments, the range sensor 133 is placed inside the extension tube 121. In certain embodiments, the range sensor 133 may also be placed on the outer surface of the extension tube 121. In certain embodiments, the converted force of the range sensor 133 represents the restoring force of the spring of the level compensator 119 and is named $F_c$, and a larger $F_c$ indicates a larger deformation of the spring of the level compensator 119, that is, the back end of the level compensator 119 enters more into the extension tube 121.

The vacuum sensor 127 determines gripping performance between the suction cup 111 and the object to ensure the success rate and efficiency of the grasping. The proximity sensor 131 functions as the position/force switch to avoid damage the object. The range sensor 133 estimates the deformation by the level compensator 119 and convert to force information for robotic arm force feedback control. In certain embodiments, $P_a$ is used to determine the contact condition, $S_p$ and $F_c$ are used to protect the system in uncertain working condition with different technology approach to increase reliability. In certain embodiments, the range sensor 133 ($F_c$) has higher resolution than the proximity sensor 131 ($S_p$), but the proximity sensor 131 is more robust. By combining the information from the three sensors, the controller 170 is able to control the end effector accurately and efficiently with high reliability, so as to meet the requirements of object operation in a limited space, such as a picking up bin. In certain embodiments, the end effector 110 may only attached with one of the proximity sensor 131 and the range sensor 133.

In certain embodiments, the end effector 110 may further include the calibration board 135 for calibrating the position and pose of the end effector 110. In certain embodiments, the calibration is performed by instructing the visual sensor 190 to capture images of the calibration board 135, and calculate the position and pose of the end effector 110 based location of the calibration board 135 relative to the end effector 110. In certain embodiments, the calibration board 135 is attached to the outer surface of the extension tube 121.

The robotic device 150 has a robotic arm to attach the end effector 110 thereon, and operates the movement of the end effector 110 according to instructions from the controller 170. The robotic device 150 may have six degrees of freedom in movement, and controls adjustment of vacuum through the vacuum control valve 115.

The controller 170 is configured to receive vacuum pressure from the vacuum sensor 127, position information from the proximity sensor 131, force from the range sensor 133, and optionally image captured by the visual sensor 190. The controller 170 is further configured to, upon receiving some or all of the above information, instruct the robotic device 150 to operate the end effector 110 through its robotic arm.

The visual sensor 190 is configured to capture images of the robotic device 150 and the environment, and send the images to the controller 170. In certain embodiments, the visual sensor 190 includes one camera. In other embodiments, the visual sensor may include two or more cameras. The controller 170 may be configured to analyze the captured images to rebuild three dimensional information of the robotic device 110, the environment, and the objects. By the analysis, the location of the objects in the environment is determined for assisting operation of the object. In certain embodiments, the analysis may also provide surface information and material of the objects based on an object database.

Figure 2:
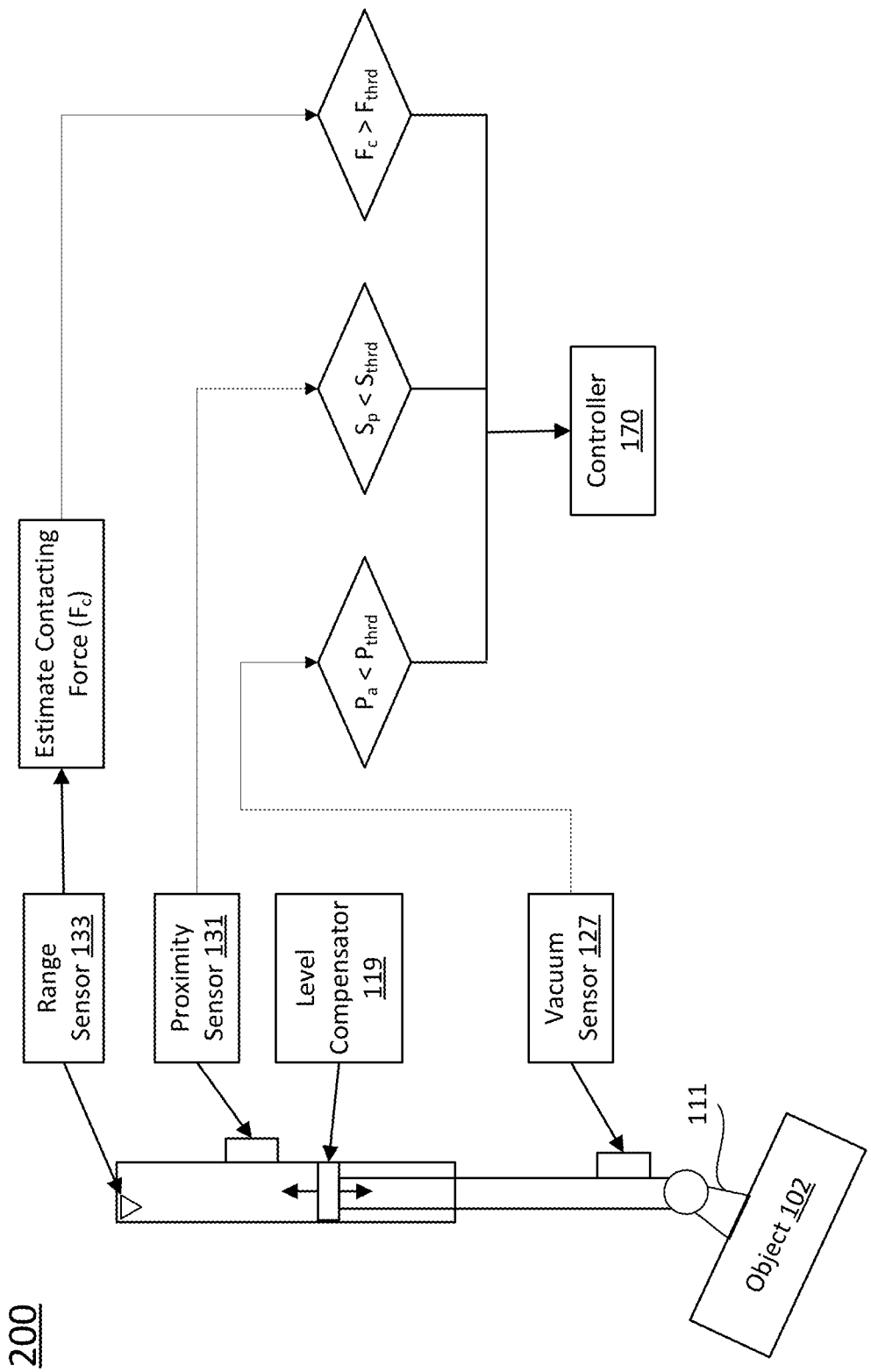
FIG. 2 schematically shows a flow chart of a method of controlling a robotic device according to certain embodiments of the present disclosure.

FIG. 2 schematically shows operation flow and algorithm based on the adaptive end according to certain embodiments of the present disclosure. As shown in FIG. 2, when the robotic arm of the robotic device 150 reaches the position and orientation to pick up the target object 102, the level and angle compensation start to work. Specifically, the range sensor 133 estimates the deformation of the level compensator 119 by detecting the distance between the range sensor 133 and the back end of the level compensator 119, calculating the deformation of the spring in the level compensator 119, and converting the deformation to compression force based on the compression rate of the spring. The force is named contacting force $F_c$. The proximity sensor 131 detects the distance between the proximity sensor 131 and the back end of the level compensator 119, and the distance or the proximity is named $S_p$. The vacuum sensor 127 measures the vacuum in the vacuum control valve 115 which corresponds to gripping performance between the object 102 and the suction cup 111. As described above, the measured vacuum is represented by the negative air pressure relative to the atmosphere and is named $P_a$, a smaller reading (such as −10 Hg) indicates a stronger vacuum than a larger reading (such as −5 Hg). In certain embodiments, the controller 170 keeps monitoring the measurement by the vacuum sensor 127, the level compensator 119 and the range sensor 133 when in operation.

When the controller 170 determines the location and a targeted surface of the object 102 to be picked up, the controller 170 instructs the robotic arm of the robotic device 150 to move the end effector 110, places the suction cup 111 along the normal direction of the targeted surface to contact the targeted surface, and switch on vacuum by opening the vacuum control valve 115 to allows vacuum to build up. During this time, $P_a \geq P_{thrd}$, that is, the vacuum at $P_a$ is not as strong as the vacuum $P_{thrd}$. In certain embodiments, $P_a \geq P_{thrd}$ indicates insufficient contact between the suction cup 111 and the object 102, or damage of the contact surface of the object 102 if vacuum cannot build up. In certain embodiments, if $P_a \geq P_{thrd}$, bump or damage may have occurred, controller 170 may provide a warning sign and stop all the operations of the robotic device 150.

When the vacuum builds up and $P_a < P_{thrd}$, that is, the suction cup 111 has a strong inside vacuum and thus contacts the object 102 with a strong suction force, the object 102 is regarded as being picked up, and later operations can start. At this time, the controller 170 keeps monitoring $S_p$ and $F_c$, and if $S_p < S_{thrd}$ or $F_c > F_{thrd}$, stops the operation. In certain embodiments, based on the differences between $S_p$ and $S_{thrd}$, or between $F_c$ and $F_{thrd}$, the controller 170 may slow down an operation, suspend the operation for a while, or stop the operation. Because of the deformation capability of the level compensator 119, there is no need to place the suction cup 111 onto the target surface of the target object very accurately. For example, a suction cup of a common robotic arm may need to be placed such that the distance between the suction cup and the target surface is about 0 accurately; in contrast, the suction cup 111 of the present disclosure can be placed such that the distance between the suction cup and the target surface is roughly about 0, or preferably roughly about a predefined negative distance (such as −0.5 cm) to ensure the contact between the suction cup 111 and the target surface. The negative distance is compensated by the level compensator 119, which means that the deformation of the spring of the level compensator 119 enables the level compensator 119 to enter into the extension tube 121 for about 0.5 cm, and the distance between the suction cup 111 and the target surface is actually 0, that is, the suction cup 111 contacts the target surface of the target object well.

Figure 3:
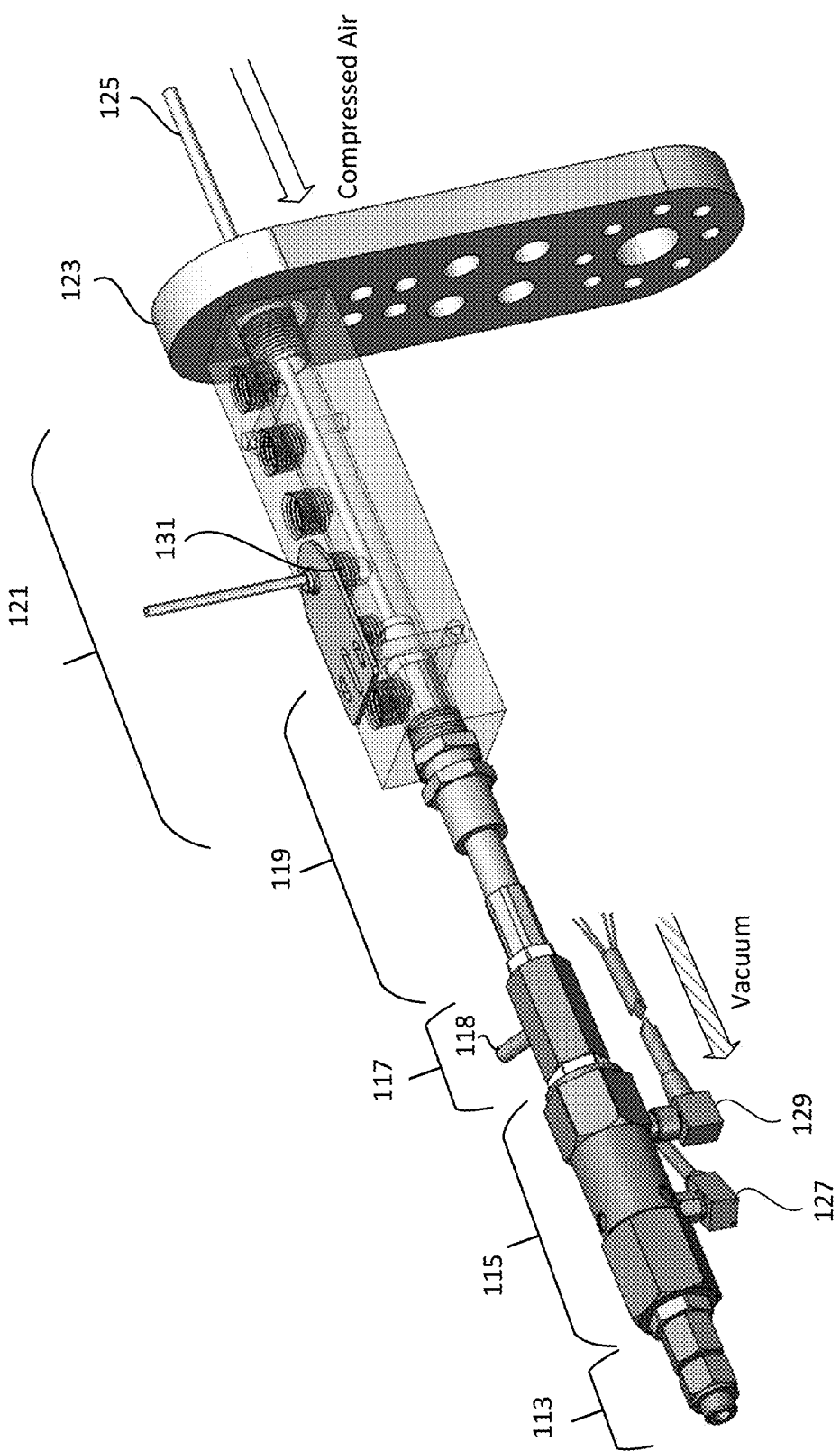
FIG. 3 schematically shows an end effector according to certain embodiments of the present disclosure.

FIG. 3 schematically shows an end effector according to certain embodiments of the present disclosure that has a non-closed extension tube. As shown in FIG. 3, the extension tube 121 has several through holes passing through the upper surface of the extension tube 121. Each through hole may be used to accommodate a structure, such as the invasive proximity sensor 131. In the embodiment shown in FIG. 3, the invasive proximity sensor 131 is screwed into the corresponding through hole on the top surface of the extension tube 121. Because the extension tube 121 is not sealed, the compressed air hose 125 enters into the extension tube 121 and runs all the way to be connected with the back end of the level compensator 119. The connection between the compressed air hose 125 and the level compensator 119 is airtight. In other words, the compressed air passes through the compressed air hose 125 into the inner channel of the level compensator 119 without leaking to the extension tube 121.

Figure 4:
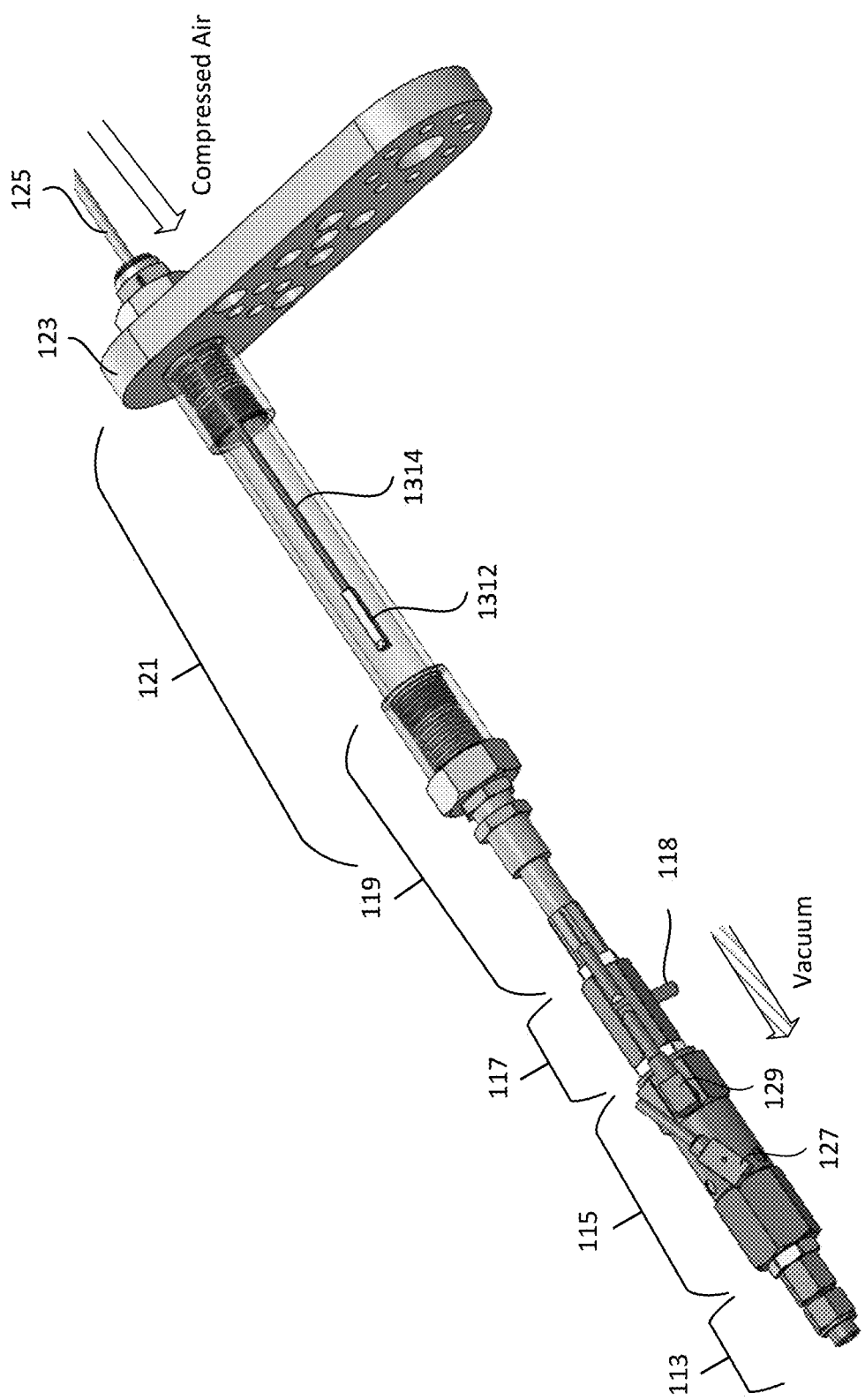
FIG. 4 schematically shows an end effector according to certain embodiments of the present disclosure.

FIG. 4 schematically shows an end effector according to certain embodiments of the present disclosure that has a closed extension tube. As shown in FIG. 4, the extension tube 121 has the front end connected to and in communication with the level compensator 119, the back end installed onto the flange 123, and the compressed air hose 125 is connected to and in communication with the back end of the extension tube 121 passing through an installation hole on the flange 123. The extension tube 121 is otherwise sealed well. The sensor body 1312 of the non-invasive proximity sensor 132 is attached to the outer surface of the extension tube 121, and the signal cable 1314 of the non-invasive proximity sensor 132 extends along the outer surface of the extension tube 121. In this type of design, there is no need to connect the compressed air hose 125 directly to the level compensator 119, there is no need to have open holes on the extension tube 121 for installing other structure components such as sensors, and the seal of the extension tube 121 is good. The compressed air runs from the compressed air hose 125 to the channel of the level compensator 119 via the inside of the extension tube 121.

Figure 5:
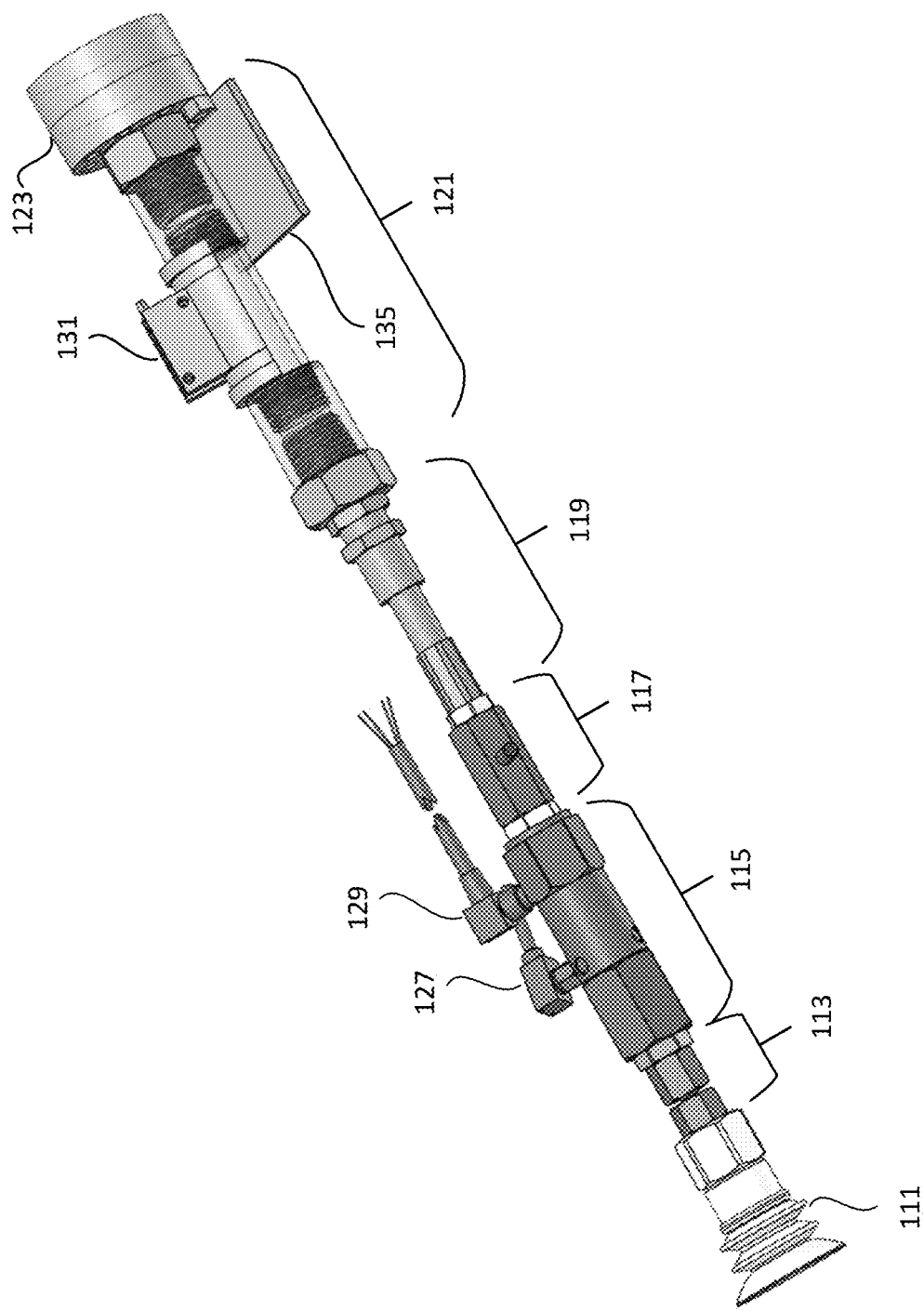
FIG. 5 schematically shows an end effector according to certain embodiments of the present disclosure.

FIG. 5 schematically shows a co-axis end effector according to certain embodiments of the present disclosure. As shown in FIG. 5, the flange 123 is located along the central axis and aligned well with the whole end effector 110. The end effector 110 can then be attached to the robotic arm directly through the flange 123. Due to the co-axis design, the end effector occupies smaller space than the off-axis version shown in FIG. 3 and FIG. 4.

In certain embodiments, the angle compensator 113 is a ball joint compensator provided by SCHMALZ with Part no.: 10.01.03.00109, or a flexible compensator provided by SCHMALZ with Part no.: 10.01.03.00152. In certain embodiments, the vacuum control valve 115 is an inline valve provided by SCHMALZ with Part no.: 10.05.01.00173. In certain embodiments, the vacuum generator 117 is an inline injector provided by SCHMALZ with Part no.: 10.02.01.00077. In certain embodiments, the level compensator 119 is an LC16-F1820 level compensator provided by Piab with Part no.: 01.24.951. In certain embodiments, the proximity sensor 131 is an MAE-AP-1A magnetic proximity sensor provided by AutomationDirect. In certain embodiments, the proximity sensor 131 is a cylinder position switch CPS9H-AN-A provided by AutomationDirect. In certain embodiments, the range sensor 133 is an OPT Short Range (CMOS) series photoelectric sensor, such as one of the OPT200X provided by AutomationDirect, depending on different range requirements by different applications. In certain embodiments, the range sensor 133 is OPT2003.

The components of the end effector 110 is not limited to the structures described in the disclosure, and the purpose of the disclosure is to provide a compact design with accurate control mechanism. In certain embodiments, the diameter of the end-effector 110 is less than 10 cm, and preferably less than 5 cm, and the length is around 15-100 cm, and preferably between 30-50 cm. In one embodiment, the diameter of the end-effector 110 is less than 5 cm, and the length is around 30 cm to 50 cm depend on applications. With the newly designed end-effector, the algorithm is simplified since we can tolerate 15 degrees and 2 cm error in height, also the picking success rate is increasing due to the adequate contact with the picked object can reduce false triggering of the vacuum sensor.

In summary, we can save 2-3 seconds for picking every single object. The cost of the end effectors is much less expensive without the use of force/torque sensors. Moreover, because the system's fault tolerance is improved, the requirements of the visual camera and even the quality of the robot itself are reduced, which further saves costs.

Figure 6:
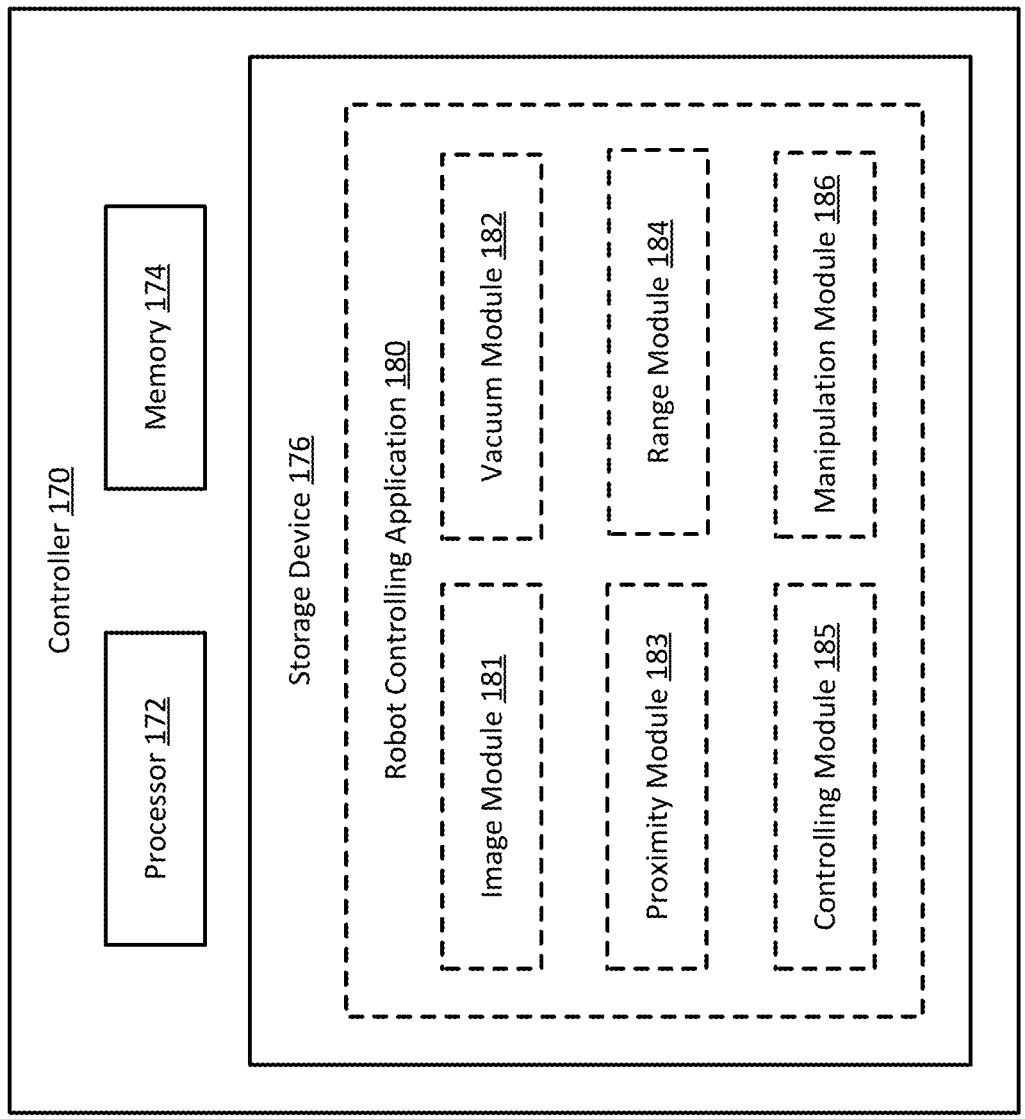
FIG. 6 schematically depicts a robotic controller according to certain embodiments of the present disclosure.

FIG. 6 shows an controller according to certain embodiments of the present disclosure. The controller 170 may be a computing device, which may be a general-purpose computer, a specialized computer, a server, or any other types computing devices. The controller 170 may work independently, or work with other devices communicated through wireless or other types of connections. Therefore, one or more of the components of the controller 170 may be placed inside the robotic device 150, or separately, or remotely.

The controller 170 may include, without being limited to, a processor 172, a memory 174, and a storage device 176. In certain embodiments, the controller 170 may include other hardware components and software components (not shown) to perform its corresponding tasks. Examples of these hardware and software components may include, but not limited to, other required memory, interfaces, buses, Input/Output (I/O) modules and peripheral devices. The processor 172 is configured to control operation of the controller 170 and may be one or more central processing units (CPU) or other type of processors. The memory 174 may be one or more volatile memory, such as the random-access memory (RAM), for storing the data and information during the operation of the controller 170. In certain embodiments, the memory 174 is in communication with the processor 172 through a system bus (not shown). The storage device 176 is a data storage media for storing an operating system (OS) (not shown) and other applications of the controller 170. Examples of the storage device 176 may include non-volatile memory such as flash memory, memory cards, USB drives, hard drives, or any other types of data storage devices.

As shown in FIG. 6, the storage device 176 stores a robot controlling application 180. The robot controlling application 180 includes computer executable code for operating the end effector 110. As shown in FIG. 6, the robot controlling application 180 includes, among other things, an image module 181, a vacuum module 182, a proximity module 183, a range module 184, a controlling module 185, and a manipulation module 186. In certain embodiments, each of the modules of the robot controlling application 180 may further include one or more sub-modules. Alternatively, in certain embodiments, some or all of the modules of the robot controlling application 180 may collectively form a single module.

The image module 181 is configured to control the visual sensor 190 to capture one or a series of images of the end effector 110, the objects, and the environment such as a bin containing the objects, and process the images to determine where the end effector 110 is positioned in the environment and where the object is 102. In certain embodiments, the processed information is a spatial information of the end effector 110, the object 102, the bin, and optionally other objects in the view of interest. In certain embodiments, the spatial information is a three dimensional (3D) map. In certain embodiments, a calibration board 135 may exist to accurately and quickly locate the end effector 110. In certain embodiments, the operation of the image module 181 is based on instructions from the controlling module 185, and the image module 181 is further configured to send the processed spatial information to the controlling module 185.

The vacuum module 182 is configured to follow instructions from the controlling module 185 to arrange monitoring of the vacuum level in the vacuum control valve 115 via the vacuum sensor 127, collect and send the vacuum signal to the controlling module 185. The proximity module 183 is configured to follow instructions from the controlling module 185 to arrange measurement of distance between the proximity sensor 131 and the back end of the level compensator 119 via the proximity sensor 131, collect and send the vacuum signal to the controlling module 185. The range module 184 is configured to follow instructions from the controlling module 185 to arrange measurement of deformation force of the level compensator 119 via the range sensor 133, collect and send the vacuum signal to the controlling module 185.

The controlling module 185 is configured to instruct the image module 181, the vacuum module 182, the proximity module 183 and the range module 184 to arrange a variety of measurements, receive collected data from those measurements at real time, perform logic inference using the received data, and provide instructions to the image module 181, the vacuum module 182, the proximity module 183 and the range module 184, and provide instructions to the manipulation module 186 to manipulate the robotic arm of the robotic device 150.

The manipulation module 186 is configured to operate the robotic arm of the robotic device 150 based on instructions from the controlling module 185, such that the end effector 110 with the suction cup 111 can manipulate an object, such as a work piece, a product or a package.

In certain aspects, the present invention relates to a non-transitory computer readable medium storing computer executable code. In certain embodiments, the computer executable code may be the robot controlling application 180 stored in the storage device 176 as described above. The computer executable code, when being executed, may perform the operations as described above, such as monitoring the system using different sensors, making decisions, and manipulating robotic arm. In certain embodiments, the non-transitory computer readable medium may include, but not limited to, the storage device 176 of the controller 170 as described above, or any other storage media of the controller 170.

In summary, according to certain embodiments, the present disclosure provides a low-cost, high-reliability, compact environment-adaptive end effector for complex environments in the logistics system. The end effector is located at the end of the robotic device and has a compact physical structure. It is an ideal solution for using in the material bin with large depth and limited operation space. The integrated level and angle compensation mechanism can adapt to the complex environment inside the material bin. The compact vacuum generation, monitoring, and control device close to the suction cup are designed to reduce the operation time and increase efficiency. This enables adaptation and compensation to complex environments within the material bin, while optimizing the generation, monitoring and control of vacuum, improving operational efficiency, protecting merchandise and equipment, and reducing reliance on complex algorithms and expensive hardware to reduce costs.

Certain embodiments of the present disclosure, among other things, have the following beneficial advantages: (1) The present disclosure provides a three degree of freedom (3-DOF) compliance compensation along surface normal of the objects to be manipulated: wide range z-axis (along the tool axis) compensation using level compensator and omni-directional angle compensation by angle compensator. (2) The present disclosure utilizes a combination of multi-sensor design for providing position sensing signals of gripper tool tip to the robotic device, so that the robotic device operate the robotic arm responsively. (3) The present disclosure provides a compact vacuum generator that is close to the suction cup during the boxing operation. (4) The present disclosure provides a compact vacuum valve that is close to the suction cup during the boxing operation. (5) Different functional modules can be integrated onto the compact structure of the environment adaptive end-effector. (6) The present disclosure provides manipulator operating flow and algorithm based on adaptive end effector for the composite environment.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An end effector for a robotic system, comprising:
an angle compensator for a suction cup to be attached thereon;
a vacuum control valve connected to and in fluid communication with the angle compensator;
a vacuum generator connected to and in fluid communication with the vacuum control valve;
a level compensator connected to and in fluid communication with the vacuum generator;
an extension tube connected to and in fluid communication with the level compensator;
a vacuum sensor connected to the vacuum control valve and configured to measure vacuum in the vacuum control valve;
a proximity sensor attached to the extension tube and configured to determine position of the level compensator; and
a range sensor attached to the extension tube and configured to determine the position of the level compensator,
wherein the angle compensator, the vacuum control valve, the vacuum generator, the level compensator, and the extension tube are substantially aligned along a central axis;
wherein the vacuum is generated when compressed air passes the extension tube, the level compensator and the vacuum generator along the central axis; and
wherein the level compensator provides compensation along the central axis.

2. The end effector of claim 1, wherein the range sensor is an optic sensor.

3. The end effector of claim 1, wherein when the suction cup is placed on an object and the vacuum is higher than a threshold vacuum, the end effector starts manipulation of the object, and when a distance between the proximity sensor and the level compensator is less than a threshold distance or when a force detected by the range sensor is greater than a threshold force, the end effector stops the manipulation of the object.

4. The end effector of claim 1, wherein the angle compensator is a passive ball joint angle compensator.

5. The end effector of claim 1, further comprising an electronic regulator controlling open and close of the vacuum control valve.

6. The end effector of claim 1, wherein the vacuum generator is a vacuum ejector.

7. The end effector of claim 1, wherein the proximity sensor is at least one of an inductive sensor and an electromagnetic sensor.

8. The end effector of claim 1, wherein the extension tube comprises a through hole for accommodating the proximity sensor, such that a part of the proximity sensor enters into the extension tube for determining the position of the level compensator accurately.

9. The end effector of claim 1, wherein the extension tube comprises a closed structure, and the proximity sensor is attached to outer surface of the extension tube.

10. The end effector of claim 1, further comprising a calibration board attached to outer surface of the extension tube for calibrating position of the end effector.

11. A robotic system, comprising:
an end effector, comprising: a suction cup, an angle compensator having the suction cup attached thereon, a vacuum control valve connected to and in fluid communication with the angle compensator, a vacuum generator connected to and in fluid communication with the vacuum control valve, a level compensator connected to and in fluid communication with the vacuum generator, an extension tube connected to and in fluid communication with the level compensator, a vacuum sensor connected to the vacuum control valve and configured to measure vacuum in the vacuum control valve, a proximity sensor attached to the extension tube and configured to determine a distance between the proximity sensor and the level compensator, and a range sensor attached to the extension tube and configured to determine a deformation force of the level compensator, wherein the angle compensator, the vacuum control valve, the vacuum generator, the level compensator, and the extension tube are substantially aligned along a central axis, vacuum is generated when compressed air passes the extension tube, the level compensator and the vacuum generator along the central axis, and the level compensator provides compensation along the central axis;
a robotic device connected to the end effector and configured to control operation of the end effector; and
a controller connected to the robotic device, the vacuum sensor, and the proximity sensor,
wherein the controller is configured to, upon receiving the vacuum from the vacuum sensor, the distance from the proximity sensor, and the force from the range sensor, control the robotic device to start manipulation of an object when the vacuum is higher than a threshold vacuum, and stop the manipulation of the object when the distance is less than a threshold distance or the force is greater than a threshold force.

12. The robotic system of claim 11, further comprising a visual sensor connected to the controller and configured to capture image of the end effector.

13. The robotic system of claim 11, wherein the angle compensator is a passive ball joint angle compensator, the vacuum generator is a vacuum ejector, the proximity sensor is at least one of an inductive sensor and an electromagnetic sensor, and the range sensor is an optic sensor.

14. The robotic system of claim 11, wherein the extension tube comprises a through hole for accommodating the proximity sensor, such that a part of the proximity sensor enters into the extension tube for determination the position of the level compensator accurately.

15. The robotic system of claim 11, wherein the extension tube comprises a closed structure, the proximity sensor is attached to outer surface of the extension tube, and the range sensor is placed inside the extension tube in an end away from the level compensator.

16. A method for controlling a robotic system,
wherein the robotic system comprises:
an end effector comprises: a suction cup, an angle compensator having the suction cup attached thereon, a vacuum control valve connected to and in fluid communication with the angle compensator, a vacuum generator connected to and in fluid communication with the vacuum control valve, a level compensator connected to and in fluid communication with the vacuum generator, an extension tube connected to and in fluid communication with the level compensator, a vacuum sensor connected to the vacuum control valve and configured to measure vacuum in the vacuum control valve, a proximity sensor attached to the extension tube and configured to determine a distance between the proximity sensor and the level compensator, and a range sensor attached to the extension tube and configured to determine a deformation force of the level compensator, wherein the angle compensator, the vacuum control valve, the vacuum generator, the level compensator, and the extension tube are substantially aligned along a central axis, the vacuum is generated when compressed air passes the extension tube, the level compensator and the vacuum generator along the central axis, and the level compensator provides compensation along the central axis;
a robotic device connected to the end effector and configured to control operation of the end effector; and
a controller connected to the robotic device, the vacuum sensor, and the proximity sensor,
wherein the method comprises:
receiving, by the controller, the vacuum from the vacuum sensor, the distance from the proximity sensor, and the force from the range sensor;
controlling the robotic device to start manipulation of an object when the vacuum is higher than a threshold vacuum; and
stopping the manipulation of the object when the distance is less than a threshold distance or the force is greater than a threshold force.

17. The method of claim 16, wherein the angle compensator is a passive ball joint angle compensator, the vacuum generator is a vacuum ejector, the proximity sensor is at least one of an inductive sensor and an electromagnetic sensor, and the range sensor is an optic sensor.

18. The method of claim 16, wherein the extension tube comprises a through hole for accommodating the proximity sensor, such that a part of the proximity sensor enters into the extension tube for determination the position of the level compensator accurately.

19. The method of claim 16, wherein the extension tube comprises a closed structure, the proximity sensor is attached to outer surface of the extension tube, and the range sensor is placed inside the extension tube in an end away from the level compensator.

* * * * *